Jan. 4, 1927.　　　　J. C. WENNER　　　　1,612,896

TRACTOR HITCH

Filed March 30, 1925　　2 Sheets-Sheet 1

Inventor
John C. Wenner.
By Franks Ahheman
Attorney

Jan. 4, 1927.
J. C. WENNER
1,612,896
TRACTOR HITCH
Filed March 30, 1925  2 Sheets-Sheet 2
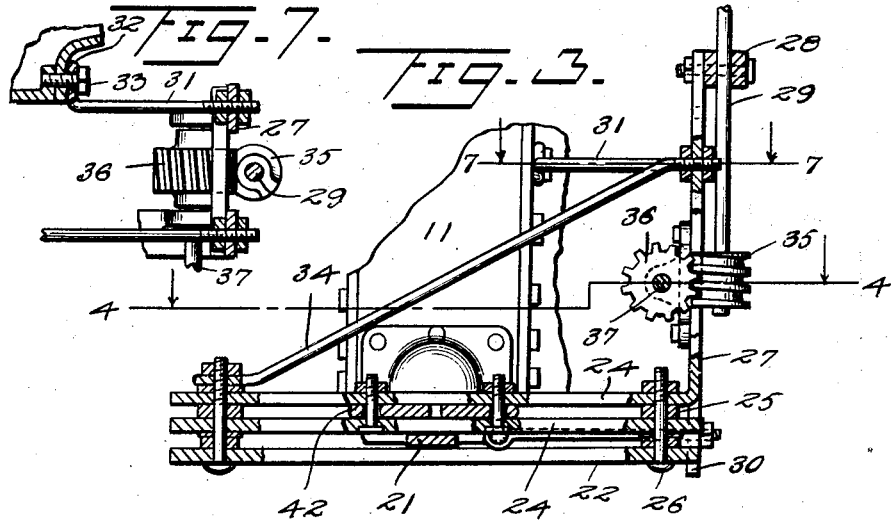
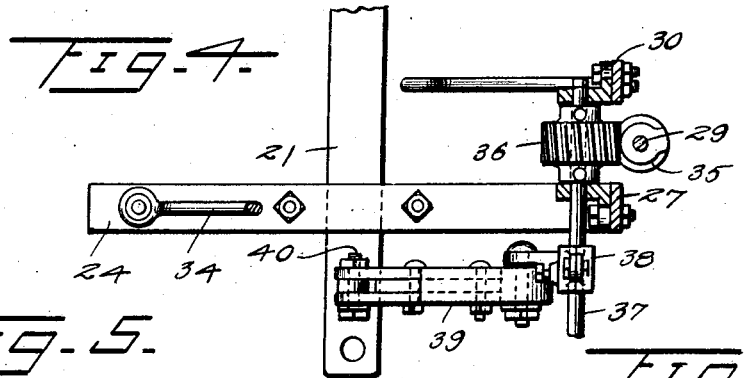
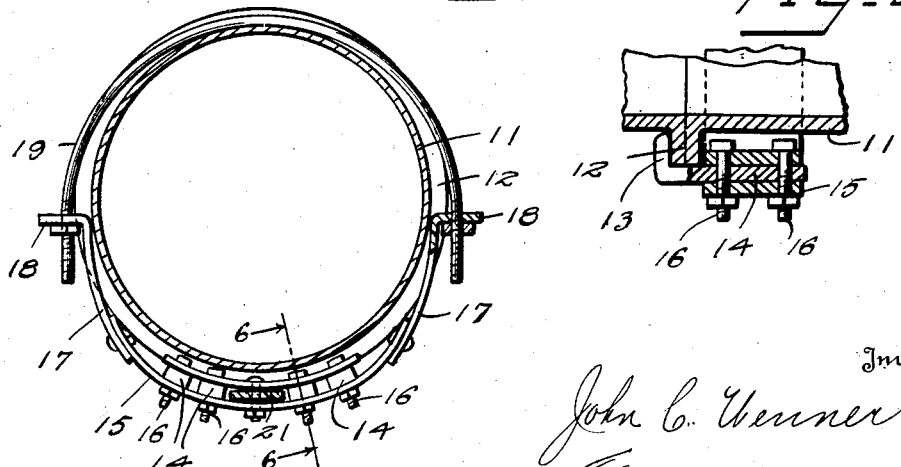

Patented Jan. 4, 1927.

1,612,896

UNITED STATES PATENT OFFICE.

JOHN C. WENNER, OF CARROLLTON, OHIO.

TRACTOR HITCH.

Application filed March 30, 1925. Serial No. 19,473.

This invention relates to trailer hitches or connections between tractors and loads, and it has for an object the provision of novel means for hitching a plow or the like to a tractor in order that the tractor may draw the plow, the said device being associated with novel means whereby the plow or the like may be guided.

It is a further object of this invention to produce a hitch having novel means of attachment to a tractor whereby the said hitch is effectually anchored thereto and in a manner that the said device may be readily detached from or applied to the tractor.

It is a still further object of this invention to produce a draw bar or hitching bar, associated with novel guides and novel means for oscillating the same, for the purpose of guiding the load; and it is furthermore an object of this invention to produce novel means for communicating oscillatory movement of the draw bar from a location or station occupied by the driver of the tractor.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 3 illustrates a sectional transverse view approximately on a line with the draw bar shifting mechanism;

Figure 4 illustrates a sectional view on the line 4—4 of Fig. 3;

Figure 5 illustrates a sectional view on the line 5—5 of Fig. 1;

Figure 6 illustrates a sectional view on the line 6—6 of Fig. 5; and

Figure 7 illustrates a section on the line 7—7 of Fig. 3 with parts broken away.

Figure 1:
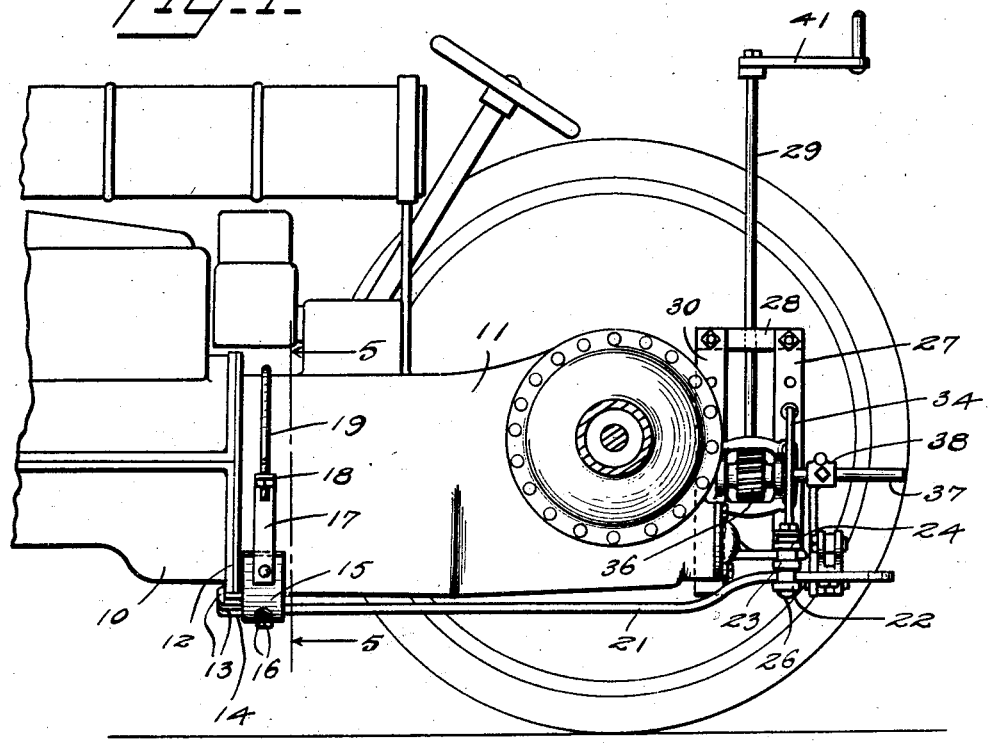
Figure 1 illustrates a view in elevation of a fragment of a tractor showing a device embodying the invention applied thereto.
Figure 2:
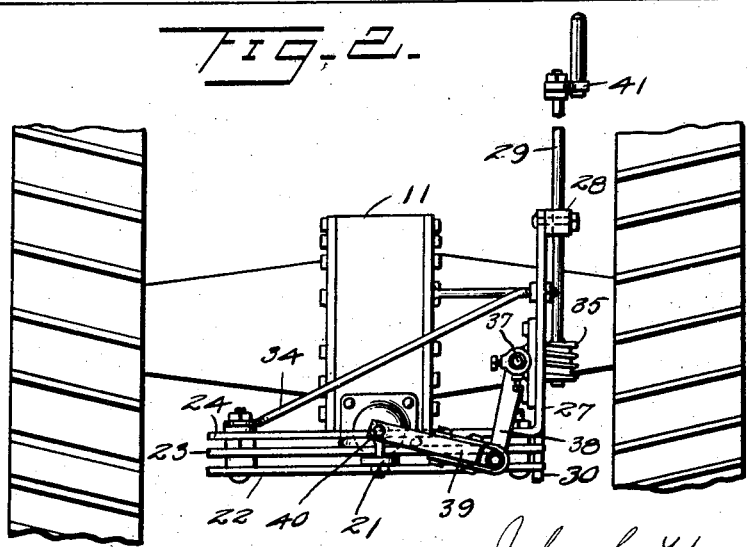
Figure 2 illustrates a rear elevation of the tractor omitting parts in advance of the rear axle.

In these drawings, 10 and 11 denote conventional casings of types of tractors having flanged joints or connections 12, and the hitch of this invention is anchored to the flange by hooks 13 whose shanks 14 are anchored to the curved plate 15 by fastenings 16 such as bolts or the like.

The curved plate has an extension 17 at each end, and the said extension has an angularly disposed apertured end 18 through which a yoke 19 projects, the said yoke, extension and plate serving as encircling devices which are applied to the case 11 rearwardly of the flange, for the purpose of holding the hooks 13 in engagement with the flange in order that when pull is exerted, the flanges will serve to resist the pull and the hitch will therefore be effectually connected to the tractor.

The draw bar 21 is pivotally connected to the curved plate 15 and it extends under the case 11 and projects at the rear of the tractor. A frame is supplied at the rear of the tractor for guiding the draw bar in its oscillation and for supporting the mechanism that communicates motion to the draw bar, and in the present embodiment of the invention, three superimposed metal bars 22, 23 and 24 are assembled with spacing collars 25 between them, and the said bars are held assembled in the manner stated by fastenings 26 such as bolts.

Preferably the draw bar extends through the space between the frame members 22 and 23 and is free to oscillate in the space so created.

The bar 24 has an upstanding end 27 forming one member of a bracket whose head 28 constitutes a bearing for a shaft 29, the said head being supported by the upstanding end 27 and a frame member 30 to which the said head is connected. The frame member 30 is held rigid by a brace 31 which connects it to the casing 11, the said brace having an eye 32 which receives a screw 33, as shown in Fig. 7. The upstanding end 27 of the bar 24 is held rigid by a brace 34 anchored to one of the bolts 26 so that the structure on which the shaft 29 is located will be rigid and practically unyielding. A worm 35 is rotatable with the shaft and it engages a worm wheel 36 on a shaft 37 operatively mounted on the frame, the said shaft 37 carrying an arm 38 which is rigidly secured to it, and the said arm in turn being pivotally connected to a pitman or link 39 that has one end oscillatably connected to the draw bar 21 by the joint 40, which may be of any appropriate type to accomplish the function intended.

The shaft 29 may be rotated by a handle 41, and it is the intention of the inventor that this handle should be located in proximity to a station occupied by the operator of the tractor in order that the said operator may run the tractor and operate the draw bar for guiding the load. The draw bar guiding frame is supported by anchoring means 42 through which the parts are suspended from the rear of the case 11.

I claim:

1. In a tractor hitch, a plate adapted to conform to the under surface of a tractor, means for holding the plate suspended under the case, hooks having shanks secured to the said plate in such relation thereto that the hooks engage a flange of the case to constitute an anchorage, a draw bar pivotally connected to the plate and projecting at the end of the tractor, superimposed and transversely disposed plates at the end of the tractor in spaced relation to each other constituting guides between which the draw bar oscillates, a plate secured with the first mentioned plates and having an upstanding portion forming a bracket, a journal on the bracket, a vertically disposed shaft therein having a worm, a worm wheel rotatably mounted on the bracket in operative relation to the worm, an arm oscillatable by the said worm wheel, means for communicating the motion of the arm to the draw bar, and means for rotating the worm.

2. In a tractor hitch, a plate adapted to the conformation of a tractor casing, hooks having shanks secured to the plates, the said hooks being adapted to partially embrace a flange of the tractor case, means for holding the plate suspended under the tractor case, said means including extensions at the ends of the plate having angularly disposed apertured ends, a yoke embracing the top of the case and having its ends projecting through the said apertures, means for adjustably securing the said ends of the yoke, a draw bar oscillatably connected to the plate, and means for changing the position of the outer end of the draw bar with relation to the end of the tractor.

3. In a tractor hitch, a plate adapted to conform to the under surface of a tractor, means for holding the plate suspended under the case, hooks having shanks secured to the said plate in such relation thereto that the hooks engage a flange of the case to constitute an anchorage, a draw bar pivotally connected to the plate and projecting at the end of the tractor, and means for oscillating the said draw bar and holding it at different positions of adjustment.

4. A tractor hitch including a member embracing a portion of the tractor, a hook on the member engaging another part of the tractor and held in engagement therewith by the embracing member, and a draft bar connected with the member.

5. A tractor hitch including a member embracing a portion of the tractor, hooks on the member engaging another part of the tractor and held in engagement therewith by the embracing member, and a draft bar connected with the member.

6. A tractor hitch including a member embracing a portion of the tractor, a hook on the member engaging another part of the tractor and held in engagement therewith by the embracing member, and a draft bar pivotally connected with the member.

JOHN C. WENNER.